US008550365B1

(12) United States Patent  
Minvielle

(10) Patent No.: US 8,550,365 B1  
(45) Date of Patent: Oct. 8, 2013

(54) SYSTEM FOR MANAGING THE NUTRITIONAL CONTENT FOR NUTRITIONAL SUBSTANCES

(71) Applicant: Eugenio Minvielle, Rye, NY (US)

(72) Inventor: Eugenio Minvielle, Rye, NY (US)

( * ) Notice: Subject to any disclaimer, the term of this patent is extended or adjusted under 35 U.S.C. 154(b) by 0 days.

(21) Appl. No.: 13/750,804

(22) Filed: Jan. 25, 2013

Related U.S. Application Data

(63) Continuation-in-part of application No. 13/485,850, filed on May 31, 2012.

(60) Provisional application No. 61/624,993, filed on Apr. 16, 2012, provisional application No. 61/624,999, filed on Apr. 16, 2012, provisional application No. 61/625,009, filed on Apr. 16, 2012.

(51) Int. Cl.  
*G06K 19/06* (2006.01)

(52) U.S. Cl.  
USPC ........... 235/492; 235/375; 235/383; 235/385; 235/451

(58) Field of Classification Search  
USPC ................ 235/375, 451, 462.01, 492, 383, 235/385  
See application file for complete search history.

(56) References Cited

U.S. PATENT DOCUMENTS

| | | | |
|---|---|---|---|
| 5,697,177 A * | 12/1997 | Ludlow et al. | .................. 40/665 |
| 5,804,803 A | 9/1998 | Cragun et al. | |
| 6,182,725 B1 | 2/2001 | Sorvik | |
| 6,491,217 B2 | 12/2002 | Catan | |
| 6,513,532 B2 * | 2/2003 | Mault et al. | .................. 600/595 |
| 6,556,963 B1 * | 4/2003 | Tetzlaff | ............................ 704/9 |
| 6,616,047 B2 | 9/2003 | Catan | |
| 6,671,698 B2 | 12/2003 | Pickett et al. | |
| 6,676,014 B2 | 1/2004 | Catan | |
| 6,691,135 B2 | 2/2004 | Pickett et al. | |
| 6,888,458 B2 | 5/2005 | Carlson | |
| 6,975,910 B1 | 12/2005 | Brown et al. | |
| 7,024,369 B1 | 4/2006 | Brown et al. | |
| 7,085,777 B2 | 8/2006 | Beck et al. | |
| 7,213,743 B2 | 5/2007 | Carlson et al. | |
| 7,256,699 B2 | 8/2007 | Tethrake et al. | |
| 7,403,855 B2 | 7/2008 | Fuessley et al. | |

(Continued)

FOREIGN PATENT DOCUMENTS

| FR | 2813683 | 3/2002 |
|---|---|---|
| WO | 02/37375 | 5/2002 |

OTHER PUBLICATIONS

Montesinos, F, "Plant-associated microorganisms: a view from the scope of microbiology," International Microbiology, Dec. 2003, vol. 6, Issue 4, pp. 221-223.

(Continued)

*Primary Examiner* — Tuyen K Vo  
(74) *Attorney, Agent, or Firm* — Nixon Peabody LLP

(57) ABSTRACT

Disclosed herein is an information encoding, marking, tracking, and transmission system for information related to nutritional substances, including nutritional content. Upon the creation of a nutritional substance, whether grown, raised, caught, collected or synthesized, information regarding the nutritional substance is accumulated, encoded and referenced to the particular nutritional substance. This information can be marked directly on the nutritional substance, but can instead be stored elsewhere, and referenced to the nutritional substance by means of a marking, unique identifier, a unique inherent property, unique genetic attribute, or an induced genetic attribute. A consumer of the nutritional substance can use this reference to retrieve the information regarding the creation of the particular nutritional substance.

25 Claims, 7 Drawing Sheets

(56) References Cited

U.S. PATENT DOCUMENTS

| | | | |
|---|---|---|---|
| 8,009,048 B2 | 8/2011 | Hyde et al. | |
| 8,112,303 B2 | 2/2012 | Eglen et al. | |
| 8,314,701 B2 | 11/2012 | Grieco et al. | |
| 2002/0125313 A1* | 9/2002 | Broff | 235/383 |
| 2003/0163354 A1* | 8/2003 | Shamoun | 705/3 |
| 2003/0165602 A1 | 9/2003 | Garwood | |
| 2003/0185937 A1* | 10/2003 | Garwood | 426/35 |
| 2008/0183588 A1* | 7/2008 | Agrawal et al. | 705/16 |
| 2009/0099873 A1 | 4/2009 | Kurple | |
| 2010/0280895 A1 | 11/2010 | Mottola | |
| 2011/0204137 A1* | 8/2011 | Scharfenort et al. | 235/375 |
| 2011/0259960 A1 | 10/2011 | Baarman et al. | |
| 2012/0016814 A1 | 1/2012 | Evans | |
| 2013/0048736 A1* | 2/2013 | Wien | 235/488 |

OTHER PUBLICATIONS

Sinclair, D.A. et al., "Unlocking the Secrets of Longevity Genes," Scientific American, Mar. 2006, vol. 294, Issue 3, pp. 48-57.

Diller, K.R., "Stress Protein Expression Kinetics," Annual Review of Biomedical Engineering, 2006, vol. 8, pp. 403-424.

Zerebecki, R.A. et al., "Temperature Tolerance and Stress Proteins as Mechanisms of Invasive Species Success," PLoS One, Apr. 2011, vol. 6, Issue 4, e14806, pp. 1-7.

Ni, Fu-Tai et al., "Gene Expression and Regulation of Higher Plants Under Soil Water Stress," Current Genomics, Jun. 2009, vol. 10, pp. 269-280.

Hayano-Kanashiro, C. et al., "Analysis of Gene Expression and Physiological Responses in Three Mexican Maize Landraces under Drought Stress and Recovery Irrigation," PLoS One, Oct. 2009, vol. 4, Issue 10, e7531, pp. 1-19.

Kingsmore, S.F., "Multiplexed protein measurement: technologies and applications of protein and antibody arrays," Nature Reviews Drug Discovery, Apr. 2006, vol. 5, pp. 310-321.

Kaume, L et al., "The Blackberry Fruit: A Review on Its Composition and Chemistry, Metabolism and Bioavailability, and Health Benefits," Journal of Agricultural and Food Chemistry, 2012, vol. 60 (23), pp. 5716-5727.

Perks, B., "Fighting Food Fraud with Science," Text reproduced from Chemistry World, 2007, vol. 4 (9), pp. 48-52.

Montealegre, C. et al., "Traceability Markers to the Botanical Origin in Olive Oils," Journal of Agricultural and Food Chemistry, 2010, vol. 58 (1), pp. 28-38.

Martins-Lopes, P. et al., "DNA Markers for Portuguese Olive Oil Fingerprinting," Journal of Agricultural and Food Chemistry, 2008, vol. 56 (24), pp. 11786-11791.

García-González, D.L. et al., "Research in Olive Oil: Challenges for the Near Future," Journal of Agricultural and Food Chemistry, 2010, vol. 58 (24), pp. 12569-12577.

Zou, Ming-Qiang et al., "Rapid Authentication of Olive Oil Adulteration by Raman Spectrometry," Journal of Agricultural and Food Chemistry, 2009, vol. 57 (14), pp. 6001-6006.

Frankel, E.N., "Chemistry of Extra Virgin Olive Oil: Adulteration, Oxidative Stability, and Antioxidants," Journal of Agricultural and Food Chemistry, 2010, vol. 58 (10), pp. 5991-6006.

Lago, Fátima C. et al., "FINS methodology to identification of sardines and related species in canned products and detection of mixture by means of SNP analysis systems," European Food Research and Technology, Jun. 2011, vol. 232(6), pp. 1077-1086.

Lago, Fátima C. et al., "Genetic Identification of Horse Mackerel and Related Species in Seafood Products by Means of Forensically Informative Nucleotide Sequencing Methodology," Journal of Agricultural and Food Chemistry, 2011, vol. 59 (6), pp. 2223-2228.

Suslick, B.A. et al., "Discrimination of Complex Mixtures by a Colorimetric Sensor Array: Coffee Aromas," Analytical Chemistry, Mar. 1, 2010, vol. 82, No. 5, pp. 2067-2073.

Rashidi, L. et al., "The Applications of Nanotechnology in Food Industry," Critical Reviews in Food Science and Nutrition, 2011, vol. 51, Issue 8, pp. 723-730.

Staggers, N. et al., "Nanotechnology: The coming revolution and its implications for consumers, clinicians, and informatics," Nursing Outlook, Sep.-Oct. 2008, vol. 56, No. 5, pp. 268-274.

Chaudhry, Q. et al., "Applications and implications of nanotechnologies for the food sector," Food Additives and Contaminants: Part A, Mar. 2008, vol. 25, Issue 3, pp. 241-258.

Srinivas, P.R. et al., "Nanotechnology Research: Applications in Nutritional Sciences," The Journal of Nutrition, Symposium—Nanotechnology Research: Applications in Nutritional Sciences, Jan. 2010, vol. 140, No. 1, pp. 119-124.

Thakur, M. et al., "Food Traceability, R&D Norway" Food Technology, Apr. 2012, p. 42-46.

Hoffman, B., "IBM Announces Food Traceability Technology," Food+Tech Connect, Oct. 19, 2011, 2 pages.

Walt, D.R., "Electronic Noses: Wake Up and Smell the Coffee," Analytical Chemistry, Feb. 1, 2005, vol. 77 (3), p. A-45.

"SIRA Technologies Food Sentinel System Thermal Barcode for Packaging," Sustainable is Good: Lifestyle and Design blog, Mar. 4, 2009, 2 pages.

Aernecke, M.J. et al., "Optical-fiber arrays for vapor sensing," Sensors and Actuators B: Chemical, Nov. 2009, vol. 142, Issue 2, pp. 464-469.

Anslyn, E.V., "Supramolecular Analytical Chemistry," The Journal of Organic Chemistry, Feb. 2, 2007, vol. 72, No. 3, pp. 687-699.

Lewis, N.S., "Comparisons between Mammalian and Artificial Olfaction Based on Arrays of Carbon Black-Polymer Composite Vapor Detectors," Accounts of Chemical Research, 2004, vol. 37, No. 9, pp. 663-672.

Röck, F. et al., "Electronic Nose: Current Status and Future Trends," Chemical Reviews, 2008, vol. 108, No. 2, pp. 705-725.

Hierlemann, A. et al., "Higher-Order Chemical Sensing," Chemical Reviews, 2008, vol. 108, No. 2, pp. 563-613.

Hsieh, Meng-Da et al., "Limits of Recognition for Simple Vapor Mixtures Determined with a Microsensor Array," Analytical Chemistry, Apr. 1, 2004, vol. 76, No. 7, pp. 1885-1895.

Grate, J.W., "Acoustic Wave Microsensor Arrays for Vapor Sensing," Chemical Reviews, 2000, vol. 100, No. 7, pp. 2627-2647.

Janata, J. et al., "Conducting polymers in electronic chemical sensors," Nature Materials, Jan. 2003, vol. 2, pp. 19-24.

Wolfbeis, O.S., "Materials for fluorescence-based optical chemical sensors," Journal of Materials Chemistry, 2005, vol. 15, pp. 2657-2669.

James, D. et al., "Chemical Sensors for Electronic Nose Systems," Microchimica Acta, Feb. 2005, vol. 149, pp. 1-17.

Primrose, S. et al., "Food forensics: methods for determining the authenticity of foodstuffs," Trends in Food Science & Technology, Dec. 2010, vol. 21 (12), pp. 582-590.

\* cited by examiner

SYSTEM FOR MANAGING THE NUTRITIONAL CONTENT FOR NUTRITIONAL SUBSTANCES

CROSS REFERENCE TO RELATED APPLICATIONS OR PRIORITY CLAIM

This application is a continuation-in-part of U.S. patent application Ser. No. 13/485,850, filed May 31, 2012, which claims priority to U.S. Provisional Patent Application Ser. No. 61/624,993 filed Apr. 16, 2012; U.S. Provisional Patent Application Ser. No. 61/624,999, filed Apr. 16, 2012; and U.S. Provisional Patent Application 61/625,009, filed Apr. 16, 2012, the contents of which are incorporated herein by reference in their entirety.

FIELD OF THE INVENTION

The present invention relates to an integrated system for collecting, transmitting and acting upon information regarding the nutritional content of nutritional substances. The invention provides methods and systems for correlating nutritional substances to their origins. The origin information may be further correlated to the nutritional value of said nutritional substance.

BACKGROUND OF THE INVENTION

Nutritional substances are traditionally grown (plants), raised (animals) or synthesized (synthetic compounds). Additionally, nutritional substances can be found in a wild, non-cultivated form, which can be caught or collected. While the collectors and creators of nutritional substances generally obtain and/or generate information about the source, history, caloric content and/or nutritional content of their products, they generally do not pass such information along to the users of their products. One reason is that the nutritional substance industries have tended to act like "silo" industries. Each group in the food and beverage industry: growers, packagers, processors, distributors, retailers, and preparers work separately, and either shares no information, or very little information, between themselves. There is generally no consumer access to, and little traceability of, information regarding the creation and/or origin, preservation, processing, preparation, or consumption of nutritional substances. It would be desirable for such information be available to the consumers of nutritional substances, as well as all participants in the food and beverage industry—the nutritional substance supply system.

While the nutritional substance supply system has endeavored over the last 50 years to increase the caloric content of nutritional substances produced (which has helped reduce starvation in developing countries, but has led to obesity problems in developed countries), maintaining, or increasing, the nutritional content of nutritional substances has been a lower priority. Caloric content refers to the energy in nutritional substances, commonly measured in calories. The caloric content could be represented as sugars and/or carbohydrates in the nutritional substances. The nutritional content of foods and beverages, as used herein, refers to the non-caloric content of these nutritional substances which are beneficial to the organisms which consume these nutritional substances. For example, the nutritional content of a nutritional substance could include vitamins, minerals, proteins, and other non-caloric components which are necessary, or at least beneficial, to the organism consuming the nutritional substances.

While there has recently been greater attention by consumer organizations, health organizations and the public to the nutritional content of foods and beverages, the food and beverage industry has been slow in responding to this attention. One reason for this may be that since the food and beverage industry operates as silos of those who create nutritional substances, those who preserve and transport nutritional substances, those who transform nutritional substances, and those who finally prepare the nutritional substances for consumption by the consumer, there has been no coordination of management of nutritional content. While each of these silo industries may be able to maintain or increase the nutritional content of the foods and beverages they handle, each silo industry has only limited information and control of the nutritional substances they receive, and the nutritional substances they pass along.

As consumers better understand their need for nutritional substances with higher nutritional content, they will start demanding that the food and beverage industry offer products which include higher nutritional content, and/or at least information regarding nutritional content of such products. In fact, consumers are already willing to pay higher prices for higher nutritional content. This can be seen at high-end grocery stores which offer organic, minimally processed, fresh, non-adulterated nutritional substances. Further, as societies and governments seek to improve their constituents' health and lower healthcare costs, incentives and/or mandates will be given to the food and beverage industry to track, maintain, and/or increase the nutritional content of nutritional substances they handle. There will be a need, not only within each food and beverage industry silo to maintain or improve the nutritional content of their products, but an industry-wide solution to allow the management of nutritional content across the entire cycle from creation to consumption. In order to manage the nutritional content of nutritional substances across the entire cycle from creation to consumption, the nutritional substance industry will need to identify, track, measure, estimate, preserve, transform, condition, and record nutritional content for nutritional substances. Of particular importance is the measurement, estimation, and tracking of changes to the nutritional content of a nutritional substance from creation to consumption. This information could be used, not only by the consumer in selecting particular nutritional substances to consume, but could be used by the other food and beverage industry silos, including creation, preservation, transformation, and conditioning, to make decisions on how to create, handle and process nutritional substances. Additionally, those who sell nutritional substances to consumers, such as restaurants and grocery stores, could communicate perceived qualitative values of the nutritional substance in their efforts to market and position their nutritional substance products. Further, a determinant of price of the nutritional substance could be particular nutritional, organoleptic, or aesthetic values, and if changes to those values are perceived as desirable. For example, if a desirable value has been maintained, improved, or minimally degraded, it could be marketed as a premium product.

For example, the grower of sweet corn generally only provides basic information as the variety and grade of its corn to the packager, who preserves and ships the corn to a producer for use in a ready-to-eat dinner. The packager may only tell the producer that the corn has been frozen as loose kernels of sweet corn. The producer may only provide the consumer with rudimentary instructions how to cook or reheat the ready-to-eat dinner in a microwave oven, toaster oven or conventional oven, and only tell the consumer that the dinner contains whole kernel corn among the various items in the dinner. Finally, the consumer of the dinner will likely not express opinions on the quality of the dinner, unless it was an especially bad experience, where the consumer might contact the producer's customer support program to complain. Very minimal, or no, information on the nutritional content of the ready-to-eat dinner is passed along to the consumer. The consumer knows essentially nothing about changes (generally degradation) to the nutritional content of the sweet corn from creation, processing, packaging, cooking, preservation, preparation by consumer, and finally consumption by the consumer.

Consumers' needs are changing as consumers are demanding healthier foods, such as "organic foods." Customers are also asking for more information about the nutritional substances they consume, such as specific characteristics relating not only to nutritional content, but to allergens or digestive intolerances. For example, nutritional substances which contain lactose, gluten, nuts, dyes, etc. need to be avoided by certain consumers. However, the producer of the ready-to-eat dinner, in the prior example, has very little information to share other than possibly the source of the elements of the ready-to-eat dinner and its processing steps in preparing the dinner. Generally, the producer of the ready-to-eat dinner does not know the nutritional content and organoleptic state and aesthetic condition of the product after it has been reheated or cooked by the consumer, cannot predict changes to these properties, and cannot inform a consumer of this information to enable the consumer to better meet their needs. For example, the consumer may want to know what proportion of desired organoleptic properties or values, desired nutritional content or values, or desired aesthetic properties or values of the corn in the ready-to-eat dinner remain after cooking or reheating, and the change in the desired nutritional content or values, the desired organoleptic properties or values, or the desired aesthetic properties or values (usually a degradation, but could be a maintenance or even improvement). There is a need to preserve, measure, estimate, store and/or transmit information regarding such nutritional, organoleptic, and aesthetic values, including changes to these values, throughout the nutritional substance supply system.

The caloric and nutritional content information for a prepared food that is provided to the consumer is often minimal. For example, when sugar is listed in the ingredient list, the consumer generally does receive any information about the source of the sugar, which can come from a variety of plants, such as sugarcane, beets, or corn, which will affect its nutritional content. Conversely, some nutritional information that is provided to consumers is so detailed, the consumer can do little with it. For example, this list of ingredients is from a nutritional label on a consumer product: Vitamins—A 355 IU 7%, E 0.8 mg 4%, K 0.5 mcg, 1%, Thiamin 0.6 mg 43%, Riboflavin 0.3 mg 20%, Niacin 6.0 mg 30%, B6 1.0 mg 52%, Foliate 31.5 mcg 8%, Pantothenic 7%; Minerals Calcium 11.6 1%, Iron 4.5 mg 25%, 211 mg 53%, Phosphorus 349 mg 35%, Potassium 476 mg 14%, Sodium 58.1 mg 2%, Zinc 3.7 mg 24%, Copper 0.5 mg 26%, Manganese 0.8 mg 40%, Selenium 25.7 mcg 37%; Carbohydrate 123 g, Dietary fiber 12.1 g, Saturated fat 7.9 g, Monosaturated Fat 2.1 g, Polysaturated Fat 3.6 g, Omega 3 fatty acids 108 g, Omega 6 fatty acids 3481, Ash 2.0 g and Water 17.2 g. (%=Daily Value). There is a need to provide information about nutritional substances in a meaningful manner. Such information needs to be presented in a manner that meets the specific needs of a particular consumer. For example, consumers with a medical condition, such as diabetes, would want to track specific information regarding nutritional values associated with sugar and other nutrients in the foods and beverages they consume, and would benefit further from knowing changes in these values or having tools to quickly indicate or estimate these changes in a retrospective, current, or prospective fashion.

If fact, each silo in the food and beverage industry already creates and tracks some information, including caloric and nutritional information, about their product internally. For example, the farmer who grew the corn knows the variety of the seed, condition of the soil, the source of the water, the fertilizers and pesticides used, and can measure the caloric and nutritional content at creation. The packager of the corn knows when it was picked, how it was transported to the packaging plant, how the corn was preserved and packaged before being sent to the ready-to-eat dinner producer, when it was delivered to the producer, and what degradation to caloric and nutritional content has occurred. The producer knows the source of each element of the ready-to-eat dinner, how it was processed, including the recipe followed, and how it was preserved and packaged for the consumer. Not only does such a producer know what degradation to caloric and nutritional content occurred, the producer can modify its processing and post-processing preservation to minimally affect nutritional content. The preparation of the nutritional substance for consumption can also degrade the nutritional content of nutritional substances. Finally, the consumer knows how she prepared the dinner, what condiments were added, and whether she did or did not enjoy it.

If there was a mechanism to share this information, the quality of the nutritional substances, including caloric and nutritional content, could be preserved and improved. Consumers could be better informed about nutritional substances they select and consume, including the state of the nutritional substance throughout its lifecycle from creation to consumption. The efficiency and cost effectiveness of nutritional substances could also be improved. Feedback within the entire chain from creator to consumer could provide a closed-loop system that could improve quality (taste, appearance, and caloric and nutritional content), efficiency, value and profit. For example, in the milk supply chain, at least 10% of the milk produced is wasted due to safety margins included in product expiration dates. The use of more accurate tracking information, measured quality (including nutritional content) information, and historical environmental information could substantially reduce such waste. Collecting, preserving, measuring and/or tracking information about a nutritional substance in the nutritional substance supply system, would allow needed accountability. There would be nothing to hide.

As consumers are demanding more information about what they consume, they are asking for products that have higher nutritional content and more closely match good nutritional requirements, and would like nutritional products to actually meet their specific nutritional requirements. While grocery stores, restaurants, and all those who process and sell food and beverages may obtain some information from current nutritional substance tracking systems, such as labels, these current systems can provide only limited information.

Nutritional substances collectors and/or producers, such as growers (plants), ranchers (animals) or synthesizer (synthetic compounds), routinely create and collect information about their products, however, that information is generally not accessible by their customers. Even if such producers wished to provide such information to their customers, there is no current method of labeling, encoding or identifying each particular product to provide such information (even though all plants, animals and in general, nutritional substances have a natural fingerprint). While there are limited methods and systems available, they are excessively costly, time consuming, and do not trace, or provide access to, the nutritional substance organoleptic and/or nutritional state across the product's lifecycle. Current labels for such products include package labels, sticker labels and food color ink labels. These labels generally are applied to all similar products and cannot identify each particular product, only variety of products, such as apple banana, but not a particular banana.

An important issue in the creation, preservation, transformation, conditioning, and consumption of nutritional substances are the changes that occur in nutritional substances due to a variety of internal and external factors. Because nutritional substances are composed of biological, organic, and/or chemical compounds, they are generally subject to degradation. This degradation generally reduces the nutritional, organoleptic, and/or aesthetic values of nutritional substances. While not always true, nutritional substances are best consumed at their point of creation. However, being able to consume nutritional substances at the farm, at the slaughterhouse, at the fishery, or at the food processing plant is at least inconvenient, if not impossible. Currently, the food and beverage industry attempts to minimize the loss of nutritional value (often through the use of additives or preservatives), and/or attempts to hide this loss of nutritional value from consumers.

Overall, the examples herein of some prior or related systems and their associated limitations are intended to be illustrative and not exclusive. Other limitations of existing or prior systems will become apparent to those of skill in the art upon reading the following Detailed Description.

OBJECTS OF THE INVENTION

It is an object of the present invention to obtain information as to the creation/origin of a nutritional substance, whether it is grown, caught, raised, or synthesized, location from where the nutritional substance originated and the like. Such information could be accessed by users or consumers of the nutritional substances by means of identification of specific nutritional substances. The means for identification can take the form of a tag, wherein such a tag can be attached to the nutritional substance. Such a tag may be a mechanical tag, an electronic tag, a molecular tag, a chemical tag or a combination thereof. Such a tag can be made up of a material attached to the nutritional substance or could be encoded directly on or in the nutritional substance.

It is an object of the present invention to obtain information as to the creation/origin of a nutritional substance, whether it is grown, raised, caught, recollected or synthesized, location from where the nutritional substance originated and the like. Such information could be accessed by users or consumers of the nutritional substances by means of identification of specific nutritional substances. The means for identification of a nutritional substance is done by identifying a unique attribute of the nutritional substance that can be used to reference the creation/origin information. Alternately, identification can be done by modifying the nutritional substance in a fashion which does not affect the nutritional quality or taste of the nutritional substance and allows the nutritional substance to be uniquely identified to reference the creation information.

It is an object of the present invention to obtain information as to the creation/origin of a nutritional substance, whether it is grown, raised, caught, collected, or synthesized. Such information could be accessed by users or consumers of the nutritional substances by means of identification of specific nutritional substances. The means for identification of a nutritional substance is done by identifying a unique genetic attribute of the nutritional substance that can be used to reference the creation information. Alternately, identification can be done by modifying the genetic attributes of the nutritional substance in a fashion which does not affect the nutritional quality or taste of the nutritional substance and allows the nutritional substance to be uniquely identified to reference the creation information.

It is an object of the present invention to minimize and/or track degradation of nutritional, organoleptic, and/or aesthetic value of nutritional substances, and/or collect, store, and/or transmit information regarding this degradation.

SUMMARY OF THE INVENTION

In an embodiment of the present invention, information as to the creation/origin of a nutritional substance, whether it is grown, caught, raised, or synthesized is obtained and stored. The means for identification can take the form tag of a label, wherein such a label can be attached to the nutritional substance. Such a label can be made up of a material attached to the nutritional substance or could be encoded directly on the nutritional substance.

In another embodiment of the present invention, information as to the creation/origin of a nutritional substance, whether it is grown, raised, caught, recollected or synthesized is referenced by means of identification of specific nutritional substances. The means for identification of a nutritional substance is done by identifying a unique attribute of the nutritional substance that can be used to reference the creation/origin information. Alternately, identification can be done by modifying the nutritional substance in a fashion which does not affect the nutritional quality or taste of the nutritional substance that allows the nutritional substance to be uniquely identified to reference the creation information.

In another embodiment of the present invention, information as to the creation/origin of a nutritional substance, whether it is grown, raised, caught, collected, or synthesized is referenced by identification of a nutritional substance by a unique genetic attribute of the nutritional substance that can be used to reference the creation information. Alternately, identification can be done by modifying the genetic attributes of the nutritional substance in a fashion which does not affect the nutritional quality or taste of the nutritional substance and allows the nutritional substance to be uniquely identified to reference the creation information.

In another embodiment of the present invention information regarding a change of nutritional, organoleptic, and/or aesthetic value of nutritional substances, collectively and individually referred to herein as $\Delta N$, is: measured or collected or calculated or created or estimated or indicated or determined in any suitable manner; stored and/or tracked and/or transmitted and/or processed prior to transformation and/or following transformation, such that the degradation of specific nutritional, organoleptic, and/or aesthetic values can be minimized and specific residual nutritional, organoleptic, and/or aesthetic value can be optimized. A change of nutritional, organoleptic, and/or aesthetic value may not occur, in which case $\Delta N$ would be zero. The change of nutritional, organoleptic, and/or aesthetic value may be a degradation, in which case $\Delta N$ would be negative. The change of nutritional, organoleptic, and/or aesthetic value may be an improvement, in which case $\Delta N$ would be positive.

In an embodiment of the present invention provides a system for the creation, collection, storage, transmission, and/or processing of information regarding nutritional substances so as to improve, maintain, or minimize degradation of nutritional, organoleptic, and/or aesthetic value of nutritional substances. Additionally, the present invention provides such information for use by the creators, preservers, transformers, conditioners, and consumers of nutritional substances. The nutritional information creation, preservation, and transmission system of the present invention should allow the nutritional substance supply system to improve its ability to minimize degradation of nutritional, organoleptic and/or aesthetic value of the nutritional substance, and/or inform the consumer about such degradation. The ultimate goal of the nutritional substance supply system is to minimize degradation of nutritional, organoleptic and/or aesthetic values, or as it relates to $\Delta N$, minimize the negative magnitude of $\Delta N$. However, an interim goal should be providing consumers with significant information regarding any change, particularly degradation, of nutritional, organoleptic and/or aesthetic values of nutritional substances consumers select and consume, the $\Delta N$, such that desired information regarding specific residual nutritional, organoleptic, and/or aesthetic values can be ascertained using the $\Delta N$. Entities within the nutritional substance supply system that provide such $\Delta N$ information regarding nutritional substances, particularly regarding degradation, will be able to differentiate their products from those who obscure and/or hide such information. Additionally, such entities should be able to charge a premium for products which either maintain their nutritional, organoleptic, and/or aesthetic value, or supply more complete information about changes in their nutritional, organoleptic, and/or aesthetic value, the $\Delta N$.

Other advantages and features will become apparent from the following description and claims. It should be understood that the description and specific examples are intended for purposes of illustration only and not intended to limit the scope of the present disclosure.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

Figure 1:
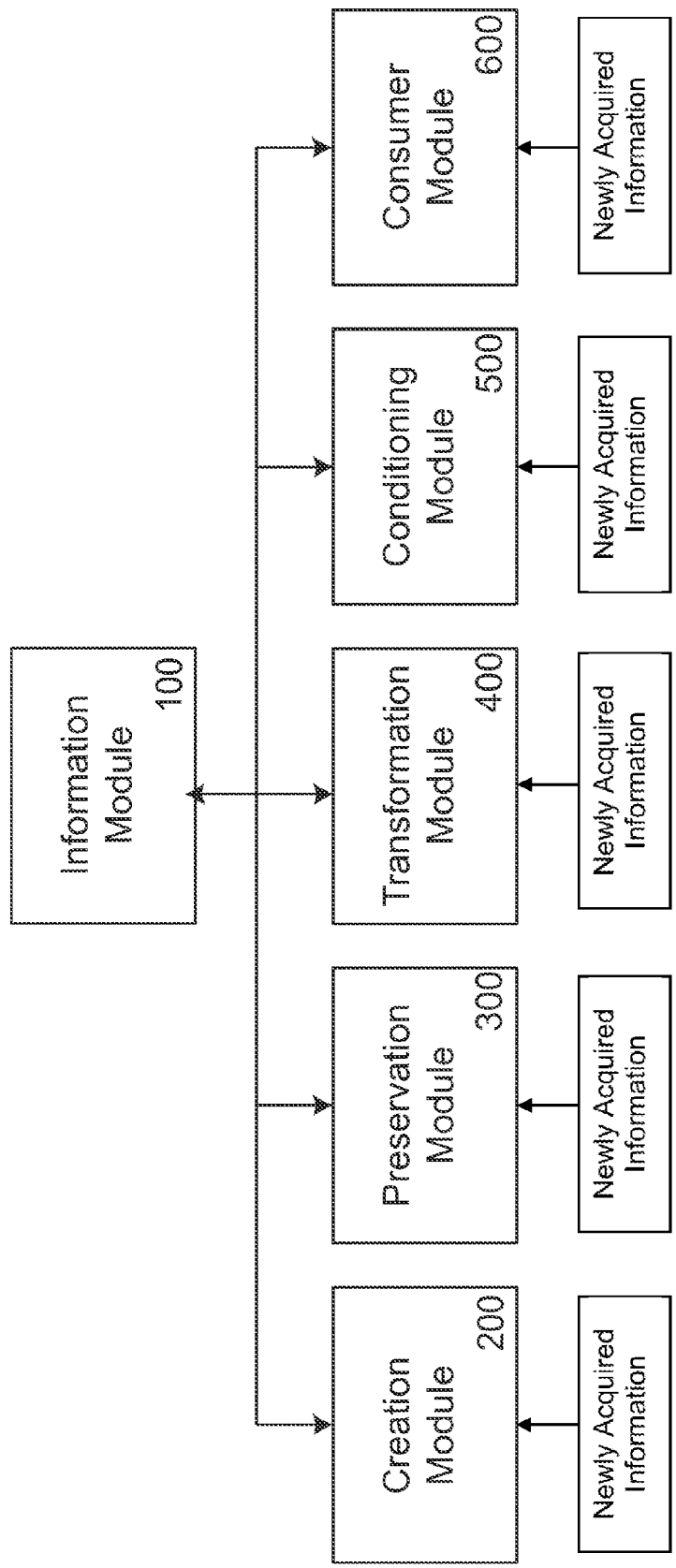
FIG. 1 shows a schematic functional block diagram of a nutritional substance supply relating to the present invention.

In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced.

DETAILED DESCRIPTION OF THE INVENTION

All references cited herein are incorporated by reference in their entirety as though fully set forth. One skilled in the art will recognize many methods and materials similar or equivalent to those described herein, which could be used in the practice of the present invention. Indeed, the present invention is in no way limited to the methods and materials described.

The various methods and techniques described below provide a number of ways to carry out the application. Of course, it is to be understood that not necessarily all objectives or advantages described can be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as taught or suggested herein. A variety of alternatives are mentioned herein. It is to be understood that some preferred embodiments specifically include one, another, or several features, while others specifically exclude one, another, or several features, while still others mitigate a particular feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, can be employed in various combinations by one of ordinary skill in this art to perform methods in accordance with the principles described herein. Among the various elements, features, and steps some will be specifically included and others specifically excluded in diverse embodiments.

Although the application has been disclosed in the context of certain embodiments and examples, it will be understood by those skilled in the art that the embodiments of the application extend beyond the specifically disclosed embodiments to other alternative embodiments and/or uses and modifications and equivalents thereof.

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

The following discussion provides a brief, general description of a representative environment in which the invention can be implemented. Although not required, aspects of the invention may be described below in the general context of computer-executable instructions, such as routines executed by a general-purpose data processing device (e.g., a server computer or a personal computer). Those skilled in the relevant art will appreciate that the invention can be practiced with other communications, data processing, or computer system configurations, including: wireless devices, Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "controller," "computer," "server," and the like are used interchangeably herein, and may refer to any of the above devices and systems.

While aspects of the invention, such as certain functions, are described as being performed exclusively on a single device, the invention can also be practiced in distributed environments where functions or modules are shared among disparate processing devices. The disparate processing devices are linked through a communications network, such as a Local Area Network (LAN), Wide Area Network (WAN), or the Internet. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data related to the invention may be distributed over the Internet or over other networks (including wireless networks), on a propagated signal on a propagation medium (e.g., an electromagnetic wave(s), a sound wave, etc.) over a period of time. In some implementations, the data may be provided on any analog or digital network (packet switched, circuit switched, or other scheme).

In some instances, the interconnection between modules is the internet, allowing the modules (with, for example, WiFi capability) to access web content offered through various web servers. The network may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), Unlicensed Mobile Access (UMA), etc.

The modules in the systems can be understood to be integrated in some instances and in particular embodiments, only particular modules may be interconnected.

FIG. 1 shows the components of a nutritional substance industry 10. It should be understood that this could be the food and beverage and beverage ecosystem for human consumption, but could also be the feed industry for animal consumption, such as the pet food industry, or even the agricultural ecosystem for the cultivation of plants. A goal of the present invention for nutritional substance industry 10 is to create, preserve, transform and trace the change in nutritional, organoleptic and/or aesthetic values of nutritional substances, collectively and individually also referred to herein as $\Delta N$, through their creation, preservation, transformation, conditioning and consumption. While the nutritional substance industry 10 can be composed of many companies or businesses, it can also be integrated into combinations of businesses serving many roles, or can be one business or even individual. Since $\Delta N$ is a measure of the change in a value of a nutritional substance, knowledge of a prior value (or state) of a nutritional substance and the $\Delta N$ value will provide knowledge of the changed value (or state) of a nutritional substance, and can further provide the ability to estimate a change in value (or state).

Module 200 is the creation module. This can be a system, organization, or individual which creates and/or originates nutritional substances. Examples of this module include a farm which grows produce; a ranch which raises cows for beef; an aquaculture farm for growing shrimp; a factory that synthesizes nutritional compounds; a collector of wild truffles; or a deep sea crab trawler.

Preservation module 300 is a preservation system for preserving and protecting the nutritional substances created by creation module 200. Once the nutritional substance has been created, generally, it will need to be packaged in some manner for its transition to other modules in the nutritional substances industry 10. While preservation module 300 is shown in a particular position in the nutritional substance industry 10, following the creation module 200, it should be understood that the preservation module 300 actual can be placed anywhere nutritional substances need to be preserved during their transition from creation to consumption.

Transformation module 400 is a nutritional substance processing system, such as a manufacturer who processes raw materials such as grains into breakfast cereals. Transformation module 400 could also be a ready-to-eat dinner manufacturer who receives the components for a ready-to-eat dinner from preservation module 300 and prepares them into a frozen dinner. While transformation module 400 is depicted as one module, it will be understood that nutritional substances may be transformed by a number of transformation modules 400 on their path to consumption.

Conditioning module 500 is a consumer preparation system for preparing the nutritional substance immediately before consumption by the consumer. Conditioning module 500 can be a microwave oven, a blender, a toaster, a convection oven, a cook, etc. It can also be systems used by commercial establishments to prepare nutritional substance for consumers such as a restaurant, an espresso maker, pizza oven, and other devices located at businesses which provide nutritional substances to consumers. Such nutritional substances could be for consumption at the business or for the consumer to take out from the business. Conditioning module 500 can also be a combination of any of these devices used to prepare nutritional substances for consumption by consumers.

Consumer module 600 collects information from the living entity which consumes the nutritional substance which has passed through the various modules from creation to consumption. The consumer can be a human being, but could also be an animal, such as pets, zoo animals and livestock, which are they themselves nutritional substances for other consumption chains. Consumers could also be plant life which consumes nutritional substances to grow.

Information module 100 receives and transmits information regarding a nutritional substance between each of the modules in the nutritional substance industry 10 including, the creation module 200, the preservation module 300, the transformation module 400, the conditioning module 500, and the consumer module 600. The nutritional substance information module 100 can be an interconnecting information transmission system which allows the transmission of information between various modules. Information module 100 contains a database where the information regarding the nutritional substance resides. Information module 100 can be connected to the other modules by a variety of communication systems, such as paper, computer networks, the internet and telecommunication systems, such as wireless telecommunication systems.

Figure 2:
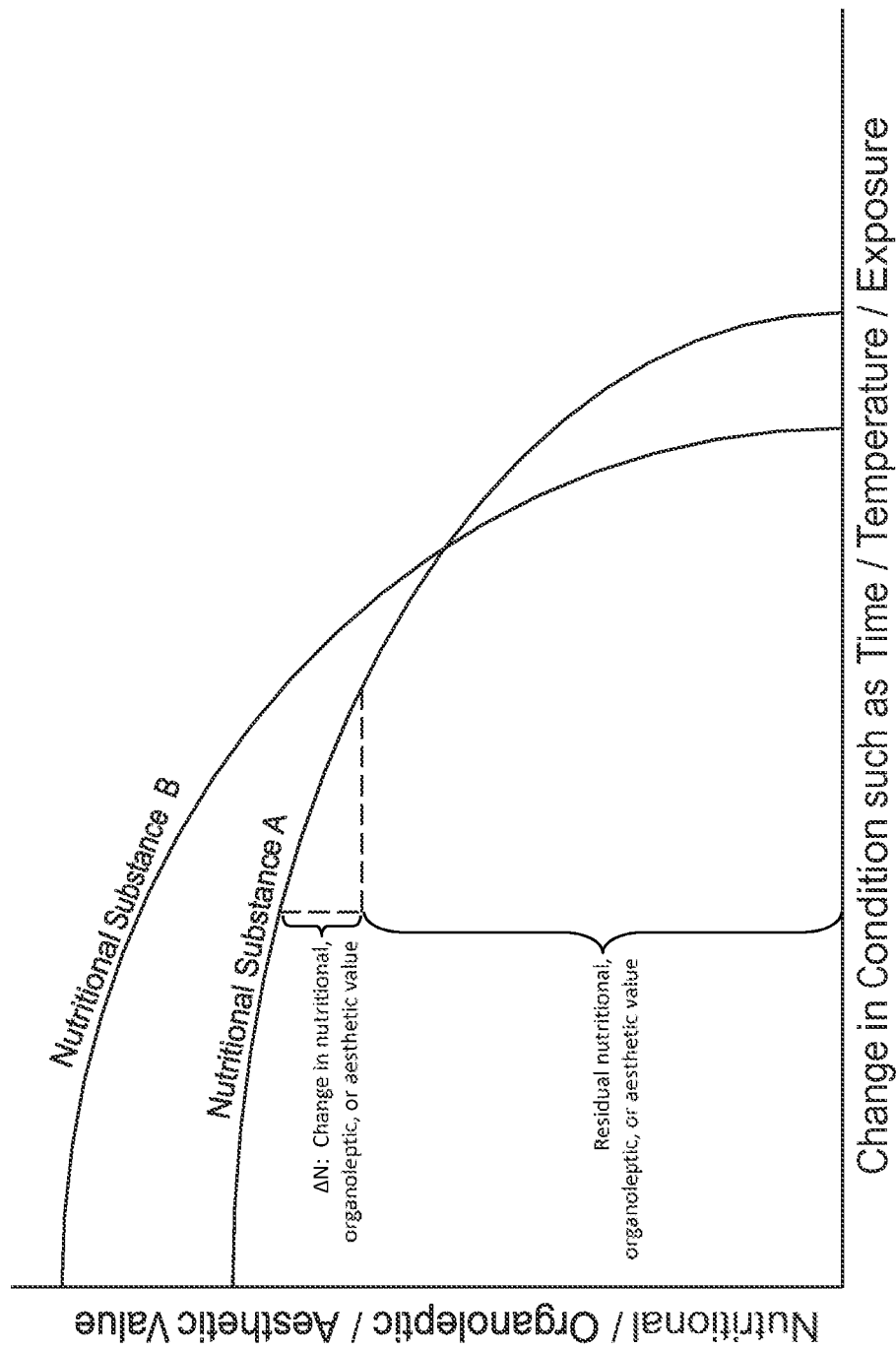
FIG. 2 shows a graph representing a value of a nutritional substance which changes according to a change of condition for the nutritional substance.

FIG. 2 is a graph showing the function of how a nutritional, organoleptic, or aesthetic value of a nutritional substance varies over the change in a condition of the nutritional substance. Plotted on the vertical axis of this graph can be either the nutritional value, organoleptic value, or even the aesthetic value of a nutritional substance. Plotted on the horizontal axis can be the change in condition of the nutritional substance over a variable such as time, temperature, location, and/or exposure to environmental conditions. This exposure to environmental conditions can include: exposure to air, including the air pressure and partial pressures of oxygen, carbon dioxide, water, or ozone; airborne chemicals, pollutants, allergens, dust, smoke, carcinogens, radioactive isotopes, or combustion byproducts; exposure to moisture; exposure to energy such as mechanical impact, mechanical vibration, irradiation, heat, or sunlight; or exposure to materials such as packaging. The function plotted as nutritional substance A could show a $\Delta N$ for milk, such as the degradation of a nutritional value of milk over time. Any point on this curve can be compared to another point to measure and/or describe the change in nutritional value, or the $\Delta N$ of nutritional substance A. The plot of the degradation in the same nutritional value of nutritional substance B, also milk, describes the change in nutritional value, or the $\Delta N$ of nutritional substance B, a nutritional substance which starts out with a higher nutritional value than nutritional substance A, but degrades over time more quickly than nutritional substance A.

If, in this example, where nutritional substance A and nutritional substance B are milk, this $\Delta N$ information regarding the nutritional substance degradation profile of each milk could be used by the consumer in the selection and/or consumption of the milk. If the consumer has this information at time zero when selecting a milk product for purchase, the consumer could consider when the consumer plans to consume the milk, whether that is on one occasion or multiple occasions. For example, if the consumer planned to consume the milk prior to the point when the curve represented by nutritional substance B crosses the curve represented by nutritional substance A, then the consumer should choose the milk represented by nutritional substance B because it has a higher nutritional value until it crosses the curve represented by nutritional substance A. However, if the consumer expects to consume at least some of the milk at a point in time after the time when the curve represented by nutritional substance B crosses the curve represented by nutritional substance A, then the consumer might choose to select the milk represented by the nutritional substance A, even though milk represented by nutritional substance A has a lower nutritional value than the milk represented by nutritional substance B at an earlier time. This change to a desired nutritional value in a nutritional substance over a change in a condition of the nutritional substance described in FIG. 2 can be measured and/or controlled throughout nutritional substance supply system 10 in FIG. 1. This example demonstrates how dynamically generated information regarding a $\Delta N$ of a nutritional substance, in this case a change in nutritional value of milk, can be used to understand a rate at which that nutritional value changes or degrades; when that nutritional value expires; and a residual nutritional value of the nutritional substance over a change in a condition of the nutritional substance, in this example a change in time. This $\Delta N$ information could further be used to determine a best consumption date for nutritional substance A and B, which could be different from each other depending upon the dynamically generated information generated for each.

In FIG. 1, Creation module 200 can dynamically encode nutritional substances to enable the tracking of changes in nutritional, organoleptic, and/or aesthetic value of the nutritional substance, or $\Delta N$. This dynamic encoding, also referred to herein as a dynamic information identifier, can replace and/or complement existing nutritional substance marking systems such as barcodes, labels, and/or ink markings. This dynamic encoding, or dynamic information identifier, can be used to make nutritional substance information from creation module 200 available to information module 100 for use by preservation module 300, transformation module 400, conditioning module 500, and/or consumption module 600, which includes the ultimate consumer of the nutritional substance. One method of marking the nutritional substance with a dynamic information identifier by creation module 200, or any other module in nutritional supply system 10, could include an electronic tagging system, such as the tagging system manufactured by Kovio of San Jose, Calif., USA. Such thin film chips can be used not only for tracking nutritional substances, by can include components to measure attributes of nutritional substances, and record and transmit such information. Such information may be readable by a reader including a satellite-based system. Such a satellite-based nutritional substance information tracking system could comprise a network of satellites with coverage of some or all the surface of the earth, so as to allow information module 100 real time, or near real time updates about a $\Delta N$ of a particular nutritional substance.

Preservation module 300 includes packers and shippers of nutritional substances. The tracking of changes in nutritional, organoleptic, and/or aesthetic values, or a $\Delta N$, during the preservation period within preservation module 300 allows for dynamic expiration dates for nutritional substances. For example, expiration dates for dairy products are currently based generally only on time using assumptions regarding minimal conditions at which dairy products are maintained. This extrapolated expiration date is based on a worst-case scenario for when the product becomes unsafe to consume during the preservation period. In reality, the degradation of dairy products may be significantly less than this worst-case. If preservation module 300 could measure or derive the actual degradation information such as $\Delta N$, an actual expiration date, referred to herein as a dynamic expiration date, can be determined dynamically, and could be significantly later in time than an extrapolated expiration date. This would allow the nutritional substance supply system to dispose of fewer products due to expiration dates. This ability to dynamically generate expiration dates for nutritional substances is of particular significance when nutritional substances contain few or no preservatives. Such products are highly valued throughout nutritional substance supply system 10, including consumers who are willing to pay a premium for nutritional substances with few or no preservatives.

It should be noted that a dynamic expiration date need not be indicated numerically (i.e., as a numerical date) but could be indicated symbolically as by the use of colors—such as green, yellow and red employed on semaphores—or other designations. In those instances, the dynamic expiration date would not be interpreted literally but, rather, as a dynamically-determined advisory date. In practice a dynamic expiration date will be provided for at least one component of a single or multi-component nutritional substance. For multi-component nutritional substances, the dynamic expiration date could be interpreted as a "best' date for consumption for particular components By law, in many localities, food processors such as those in transformation module 400 are required to provide nutritional substance information regarding their products. Often, this information takes the form of a nutritional table applied to the packaging of the nutritional substance. Currently, the information in this nutritional table is based on averages or minimums for their typical product. Using the nutritional substance information from information module 100 provided by creation module 200, preservation module 300, and/or information from the transformation of the nutritional substance by transformation module 400, the food processor could include a dynamically generated nutritional value table, also referred to herein as a dynamic nutritional value table, for the actual nutritional substance being supplied. The information in such a dynamic nutritional value table could be used by conditioning module 500 in the preparation of the nutritional substance, and/or used by consumption module 600, so as to allow the ultimate consumer the ability to select the most desirable nutritional substance which meets their needs, and/or to track information regarding nutritional substances consume.

The change in nutritional, organoleptic, and/or aesthetic value, or $\Delta N$, by conditioning module 500 is currently not tracked or provided to the consumer. However, using information provided by information module 100 from creation module 200, preservation module 300, transformation module 400, and/or information measured or generated by conditioning module 500, conditioning module 500 could provide the consumer with the actual, and/or estimated change in nutritional, organoleptic, and/or aesthetic values of the nutritional substance, or $\Delta N$. Such information regarding the change to nutritional, organoleptic and/or aesthetic value of the nutritional substance, or $\Delta N$, could be provided not only to the consumer, but could also be provided to information module 100 for use by creation module 200, preservation module 300, transformation module 400, so as to track, and possibly improve nutritional substances throughout the entire nutritional substance supply system 10.

The information regarding nutritional substances provided by information module 100 to consumption module 600 can replace or complement existing information sources such as recipe books, food databases like www.epicurious.com, and Epicurious apps. Through the use of specific information regarding a nutritional substance from information module 100, consumers can use consumption module 600 to select nutritional substances according to nutritional, organoleptic, and/or aesthetic values. This will allow consumers to make informed decisions regarding nutritional substance additives, preservatives, genetic modifications, origins, traceability, and other nutritional substance attributes. This information can be provided by consumption module 600 through personal computers, laptop computers, tablet computers, and/or smartphones. Software running on these devices can include dedicated computer programs, modules within general programs, and/or smartphone apps. An example of such a smartphone app regarding nutritional substances is the iOS ShopNoGMO from the Institute for Responsible Technology. This iPhone app allows consumers access to information regarding nongenetically modified organisms they may select. Additionally, consumption module 600 may provide information for the consumer to operate conditioning module 500 in such a manner as to preserve or optimize or minimize degradation of nutritional, organoleptic, and/or aesthetic value.

Through the use of nutritional substance information available from information module 100 nutritional substance supply system 10 can track nutritional, organoleptic, and/or aesthetic value. Using this information, nutritional substances travelling through nutritional substance supply system 10 can be dynamically valued and priced according to nutritional, organoleptic, and/or aesthetic values. For example, nutritional substances with longer dynamic expiration dates (longer shelf life) may be more highly valued than nutritional substances with shorter expiration dates. Additionally, nutritional substances with higher nutritional, organoleptic, and/or aesthetic values may be more highly valued, not just by the consumer, but also by each entity within nutritional substance supply system 10. This is because each entity will want to start with a nutritional substance with higher nutritional, organoleptic, and/or aesthetic value before it performs its function and passes the nutritional substance along to the next entity.

During the period of implementation of the present inventions, there will be nutritional substances being marketed which including the information, information-enabled nutritional substances, and nutritional substances which are not information enabled, dumb nutritional substances. Information-enabled nutritional substances would be available in virtual internet marketplaces, as well as traditional marketplaces. Because of information provided by information-enabled nutritional substances, entities within the nutritional substance supply system 10, including consumers, would be able to review and select information-enabled nutritional substances for purchase. It should be expected that, initially, the information-enabled nutritional substances would enjoy a higher market value and price than dumb nutritional substances. However, as information-enabled nutritional substances become more the norm, the cost savings from less waste due to degradation of information-enabled nutritional substances could lead to their price actually becoming less than dumb nutritional substances.

For example, the producer of a ready-to-eat dinner would prefer to use corn of a high nutritional, organoleptic, and/or aesthetic value in the production of its product, the ready-to-eat dinner, so as to produce a premium product of high nutritional, organoleptic, and/or aesthetic value. Depending upon the levels of the nutritional, organoleptic, and/or aesthetic values, the ready-to-eat dinner producer may be able to charge a premium price and/or differentiate its product from that of other producers. When selecting the corn to be used in the ready-to-eat dinner, the producer will seek corn of high nutritional, organoleptic, and/or aesthetic value from preservation module 300 that meets its requirements for nutritional, organoleptic, and/or aesthetic value. The packager/shipper of preservation module 300 would also be able to charge a premium for corn which has high nutritional, organoleptic, and/or aesthetic values. And finally, the packager/shipper of preservation module 300 will select corn of high nutritional, organoleptic, and/or aesthetic value from the grower of creation module 200, who will also be able to charge a premium for corn of high nutritional, organoleptic, and/or aesthetic values.

The nutritional, organoleptic, and/or aesthetic value for a nutritional substance tracked through nutritional substance supply system 10 through nutritional substance information from information module 100 can be preferably measured information. However, some or all such nutritional substance information may be derived through measurements of environmental conditions of the nutritional substance as it traveled through nutritional substance supply system 10. Additionally, some or all of nutritional substance information can be derived from data of other nutritional substances which have traveled through nutritional substance supply system 10. Finally, nutritional substance information can also be derived from laboratory experiments performed on other nutritional substances, which may approximate conditions and/or processes to which the actual nutritional substance has been exposed.

For example, laboratory experiments can be performed on bananas to determine effect on nutritional, organoleptic, and/or aesthetic value for a variety of environmental conditions bananas may be exposed to during packaging and shipment in preservation module 300. Using this experimental data, tables and/or algorithms could be developed which would predict the level of nutritional, organoleptic, and/or aesthetic values for a particular banana based upon information collected regarding the environmental conditions to which the banana was exposed during its time in preservation module 300. While the ultimate goal for nutritional substance supply system 10 would be the actual measurement of nutritional, organoleptic, and/or aesthetic values, use of derived nutritional, organoleptic, and/or aesthetic value from experimental information would allow more accurate tracking of nutritional, organoleptic, and/or aesthetic values while technology and systems are put in place to allow actual measurement.

Figure 3:
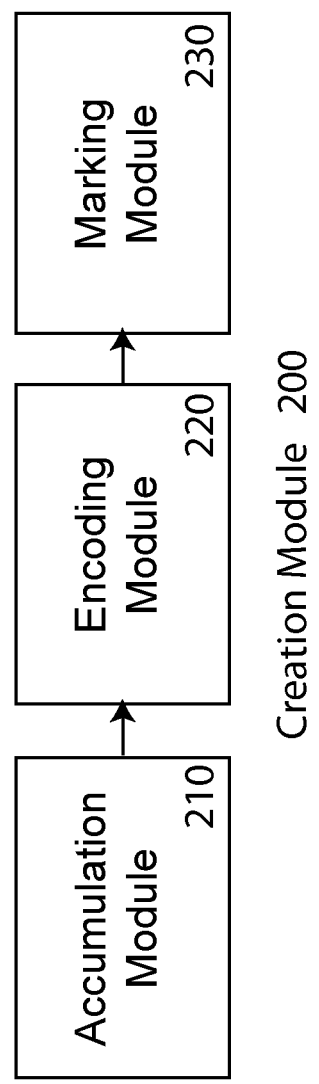
FIG. 3 shows a schematic functional block diagram of the creation module 200 according to the present invention.

FIG. 3 shows an embodiment of the creation/origin module of the present invention. During the creation/origin of the nutritional substance, creation information regarding the origin and creation of the nutritional substance can be accumulated by accumulation module 210. This creation information is generally known by the creator of the nutritional substance. For example, the grower of sweet corn, knows the land and contacts the seed and traits producer to decide on the seeds that need to be planted in consequence knows the seeds that were planted, knows where the corn seed is planted, when the corn seed was planted, the soil conditions, the source of the water used to irrigate the corn, when the corn is to be harvested or the truffles gathered. Additionally, the grower knows what fertilizers, pesticides, and other substances were used to nourish and protect during growing of the corn.

Accumulation module 210 receives and stores all such creation information that is available from the grower. Accumulation module 210 can take the form of a computer running a data storage program, such as a database.

In another example from the meat industry, the rancher raising a cow for beef knows the cows parental lineage, knows how the cow was raised, whether in a controlled environment or on the open range, and knows when the cow was slaughtered. Additionally, the rancher knows the medical history of the cow, including its general health, any diseases or injuries it suffered, and any medical treatment it received. Additionally, the rancher knows of the cow's immunization history and any medications, supplements and vaccines the cow was given, such as hormones, antibiotics and nutritional supplements. Also the rancher has all the information of the cow's milk production cycle and of the rate of growth, if it has been free range grass fed or in a confined environment and the state and method used to have it slaughtered. This creation information can be accumulated by accumulator module 210 and in the same way we explained the process for the corn a database that could be monitored on real time though a local or global access network.

In another example, the creator of a synthetic nutritional substance knows the source of the molecules used to create the nutritional substance, such as a vitamin complex. A multivitamin manufacturer knows the source of the ascorbic acid modules (vitamin C), the source of magnesium and the source of iron, and knows how they were processed into the multivitamin. Such creation information would also be accumulated by accumulator module 210 and a database that could be monitored on real time through a local or global access network. In various embodiments, the accumulator module 210 comprises information contained in the tags associated with a nutritional substance as described below.

In various embodiments, methods and systems are provided to tag the origin information in or about the nutritional substance. As used herein, "origin" refers to, for example, location of a specific farm where the nutritional substance is grown, location of a ranch from where the meats and/or poultry originated, location of a fishery from where the fish are caught or reared, location of a seafood farms from where the seafood is cultivated, countries, cities, states, zip codes, or latitude and longitudinal positions of the origins of the nutritional substances, or a combination thereof. In some embodiments, the origin information may originate from the creator of the nutritional substance (such as from a farmer, a rancher, a fishery etc.). In other embodiments, the origin information may originate from facilities that read the origin information contained in the nutritional substances, such as labs that run assays to read the molecular tags contained in the nutritional substance.

As used herein, a "unique information identifier" or an "information identifier" refers to a code that correlates a nutritional substance with information about the nutritional substance including but not limited to its origin, its nutritional value or combinations thereof. The information identifier may be used to, for example, relate the encoded nutritional substance with information stored in an information module, such as a storage system. The storage system may be a computer, a computer database, the cloud or a combination thereof.

Tags comprise information about the origin of the nutritional substance. The tags do not affect taste, texture or nutritional characteristics of the nutritional substance. The tags may be any one or more of a mechanical tag, an electronic tag, a molecular tag, a chemical tag or a combination thereof.

In some embodiments, the tag comprising the origin information is a label that is human readable. In some embodiments, the label is directly attached to the nutritional substance (for example, stuck on to the nutritional substance). In other embodiments, the label may be, indirectly attached to the nutritional substance (for example, attached on a package containing the nutritional substance). The label may further include all or partial information about the nutritional content of the nutritional substance. Such labels can be made of paper, plastic, foil, cardboard, glass or other synthetic material and may be removed before consumption of the nutritional substance. The information on the label may also be stored in the Information Module 100 such as a storage system. The label may further comprise an information identifier that links/connects the information contained on the label about a nutritional substance with the information stored in a storage system (for example, a computer, a database, on the cloud or a combination thereof) about the same nutritional substance. The storage system may contain additional information associated with the nutritional substance that is not present on the label (for example, additional details of the nutritional content of the nutritional substance). In some embodiments, the nutritional information contained on the label and/or in the storage system provides the starting value for calculating the change in nutritional content ($\Delta N$) as the nutritional substance is transported from the creator to the consumer 600, either directly or indirectly, via anyone or more of the preservation system 300, transformation system 400, conditioning system 500, or a combination thereof. As the nutritional substance moves through each of the aforementioned systems, the nutritional content/value information is updated in the Information Module 100 (storage system), thus providing a ΔN value and a more accurate representation of the nutritional content in the nutritional substance.

In further embodiments, the tags comprising the origin information may be computer readable, such as mechanical tags. Such tags include but are not limited to Quick Response (QR) tags, barcodes, infrared tags or magnetic tags. Such computer readable tags may be on, for example, a sticker, that is directly (e.g. on the skin of a pineapple) or indirectly (e.g. on a bushel of apples, wherein each apple in the bushel has the same origin and same or very similar nutrient content) associated with the nutritional substance. These tags may further contain all or partial information about the nutritional content of the nutritional substance. These tags may further comprise an information identifier that links/connects the information contained on the mechanical tag about a nutritional substance with the information stored in an Information Module 100 such as a storage system (for example, a computer, a database, on the cloud or a combination thereof) about the same nutritional substance. The storage system may contain additional information associated with the nutritional substance that is not present on the tags (for example, additional details of the nutritional content of the nutritional substance). The nutritional information contained in the mechanical tags and/or in the storage system provides starting values for calculating the change in nutritional content (ΔN) as the nutritional substance is transported from the creator to the consumer 600, either directly or indirectly, via anyone or more of the preservation system 300, transformation system 400, conditioning system 500, or a combination thereof. As the nutritional substance moves through each of the aforementioned systems, the nutritional content information is updated in the Information Module 100 (storage system), thus providing a ΔN value and a more accurate representation of the nutritional content in the nutritional substance.

The mechanical tags may further encode, for example, Uniform Resource Locators (URLs) such that when scanned, the user is directed to a storage system that includes information about the nutritional substance. As described below, QR tags, barcodes, infrared tags or magnetic tags require a reader module (240) to retrieve the information stored in the tags. In some embodiments, reading of the mechanical codes such as the barcode or QR codes with a reader (for example visible light or infrared reader) may trigger a website to be launched that has information including but not limited to the nutritional content, caloric content, origin, growth conditions and the precise locations of creation of the nutritional substance. Alternately, reading of the QR codes with a reader may trigger a file to be downloaded that comprises the aforementioned information. The readers include but are not limited to scanners or WAN devices (such as smartphones).

In additional embodiments, the tags comprising origin information may be electronic tags such as radio frequency identification (RFID) tags (U.S. Pat. Nos. 8,314,701; 6,671,698; 6,182,725; 6,888,458; 7,256,699; 7,403,855). Such electronic tags may be on, for example, a sticker, that is directly (e.g. on the skin of a pineapple) or indirectly (e.g. on a bushel of apples, wherein each apple in the bushel has the same origin and same or very similar nutrient content) associated with the nutritional substance. These tags may further contain all or partial information about the nutrient content and nutritional value in the nutritional substance. These tags may further comprise an information identifier that links/connects the information contained on the mechanical tag about a nutritional substance with the information stored in a storage system (for example, a computer, a database, on the cloud or a combination thereof) about the same nutritional substance. The storage system may contain additional information associated with the nutritional substance that is not present on the tags (for example, additional details of the nutritional content of the nutritional substance). The nutritional information contained in the electronic tags and/or in the storage system provides starting values for calculating the change in nutritional content (ΔN) as the nutritional substance is transported from the creator to the consumer 600, either directly or indirectly, via anyone or more of the preservation system 300, transformation system 400, conditioning system 500, or a combination thereof. As the nutritional substance moves through each of the aforementioned systems, the nutritional content information is updated in the Information Module 100 (storage system), thus providing a ΔN value and a more accurate representation of the nutritional content in the nutritional substance.

The electronic tags may further encode, for example, Uniform Resource Locators (URLs) such that when scanned, the user is directed to an Information Module (storage system) that includes information about the nutritional substance. Electronic tags require a reader module (240) to retrieve the information stored in the tags. In some embodiments, reading of the electronic tags with a reader may trigger a website to be launched that has information including but not limited to the nutritional content, caloric content, growth conditions and the precise locations of creation of the nutritional substance. Alternately, reading of the electronic tags with a reader may trigger a file to be downloaded that comprises the aforementioned information. The readers include but are not limited to scanners or WAN devices (such as smartphones).

In various embodiments, molecular tags may be used to correlate the origin of nutritional substances to their origin. For example, a unique set of genetic and epigenetic fingerprints may be used to trace the origins of nutritious substances. Such fingerprints may be naturally occurring in the nutritious substances or nutritious substances may be modified to express such fingerprints. For example, if the genome of the apple seeds in country 1 are modified to express long-term-repeat (LTR) sequence 1 and produce bushel-1 of apples and genome of apple seeds for apples grown in country 2 are modified to express LTR2 and produce bushel-2 of apples, sequencing the apples from each bushel can provide information about the origin of the apple. The LTR sequence is unique to each origin. The information about the LTR sequences associated with each bushel of apples and the associated country may be stored in a storage system such as a computer, a computer database the cloud or a combination thereof.

In some embodiments, nutritional substances can be analyzed for presence or absence of naturally occurring microorganisms that live synergistically with the plant. The types and/or numbers of microorganisms may form a unique molecular fingerprint allowing correlation of a nutritional substance to its origin. Differences in environmental queues may result in distinct varied microbial presence in plants. For example, oranges from Florida may have a different microbial biome compared to those from California. Such differences may serve as signatures of origins of nutritional substances. In some embodiments, cultivation-dependent methods to detect micro-organisms include but not limited to PCR, RFLP, fatty acid profiles (FAME), nutritional (Biolog) may been used to characterize specific groups of plant-associated bacteria and fungi. Cultivation-independent PCR-based microorganism fingerprinting techniques to study small subunit (SSU) rRNA genes (rDNA) in the prokaryote microbial fraction may be used to study diversity, structural composition and dynamics of microbial communities associated with plants. For example, using terminal restriction length polymorphism, (T-RFLP) in a study of corn-associated bacteria, signals related to *Cytophaga/Bacteroides/Flavobacterium phylum, Holophaga/Acidobacterium phylum*, α-proteobacteria, β-proteobacteria and γ-proteobacteria were detected (Montesinos, E. *Int Microbiol* 2003 Vol 6 221-223). Similarly, microbial patterns (presence, absence, numbers and identities of microorganisms) may be used a fingerprints to correlate nutritional substances to their origins.

Expressions of various proteins in nutritional substances may also be used to correlate nutritional substances to their origins. In virtually all organisms, various stress conditions result in various genes being up- or down-regulated, resulting in a distinct protein profile (Sinclair, D. and Guarente, L., *Scientific American* March 2006 pp 48-57; Diller, K., *Annual Review of Biomedical Engineering* 2006 vol 8:403-424; Zerebecki R A, Sorte C J B (2011) *PLoS ONE* 6(4): e14806). In some embodiments, fruits and vegetables grown under drought conditions or nutrient-poor soil conditions may have a different protein profile compared to the same fruits and vegetables grown under drought-free and nutrient-rich soil conditions (Fu-Tai, Ni, *Current Genomics* 2009 Vol 10 269-280). For example, a correlation between levels of photosynthesis and transcription under stress was observed and differences in the number, type and expression levels of transcription factor families were also identified under drought and recovery between the three maize landraces (Hayano-Kanashiro, C et al., *PLoS One* 2009 Vol 4(10) e7531 1-19). Methods for analyzing protein expression will be known to one skilled in the art and include but are not limited to methods discussed in "Protein Methods", 2nd Edition by Daniel M. Bollag, Michael D. Rozycki and Stuart J. Edelstein (1996) Published by Wiley Publishers or in Kingsmore, S., Nature Reviews Drug Discovery 5, 310-321 (April 2006).

The micronutrient content of a nutritional substance may vary based on conditions including but not limited to any one or more of environmental, soil, growth, water, light etc. In some embodiments, the micronutrient content in nutritional substances may be used to correlate a nutritional substance to its origin. For example, the blackberry phenolic composition and concentrations are influenced by genetics, growing conditions, and maturation and, for example, changes in growing conditions may alter changes in phenolic composition (Kaume, L. et al., *J. Agric. Food Chem.*, 2012, 60 (23), pp 5716-5727). This may serve as a marker for associating various batches of blackberries with their origin. In another example, aloe vera comprises three main components: glucose; malic acid; and the polysaccharide acemannan, which is composed of a long chain of mannose monomers. On average, each mannose monomer ring has one acetate group attached to one of three available positions. Using nuclear magnetic resonance (NMR), the profiles of different acetate groups represent a fingerprint for aloe vera and its origin (Perks, B., *Chemistry World* 2007 49-52). Pure varieties of coffee beans may be distinguished according to profiles of analytes such as sterols, fatty acids and total amino acids. Mixtures may be characterized using, for example, Fourier transform infrared spectroscopy (FTIS). Since the beans contain different amounts of the two main coffee compounds—chlorogenic acid and caffeine—which have distinctive infrared spectra, FTIS may be used to trace coffee beans to their origins (Perks, B., *Chemistry World* 2007 49-52). Similarly, the micronutrient content of various nutritional substances may be used to trace a nutritional substance to its origin.

In additional embodiments, DNA markers may be used to correlate nutritional substances with their origins. For example, origins of varieties of olive oil may be determined using Random Amplification of Polymorphic DNA (RAPD), Inter Simple Sequence Repeats (ISSR), and Simple Sequence Repeats (SSR) molecular markers (Montealegre, C et al., *J. Agric. Food Chem.*, 2010, 58 (1), pp 28-38; Martin-Lopes, P., *J. Agric. Food Chem.*, 2008, 56 (24), pp 11786-11791; García-González, D., *J. Agric. Food Chem.*, 2010, 58 (24), pp 12569-12577). Methods including spectroscopy such as Raman spectroscopy may also be used (Zou et al., *J. Agric. Food Chem.*, 2009, 57 (14), pp 6001-6006; Frankel, E. *J. Agric. Food Chem.*, 2010, 58 (10), pp 5991-6006). Additionally, any one or more of PCR analysis, restriction fragment length polymorphism (RFLP) or lab-on-a-chip capillary electrophoresis methods may also be used to trace nutritional sources to their origins. In further embodiments, mitochondrial DNA may be PCR amplified and sequenced to trace a nutritional substance to its origin. For example, analyzing mitochondrial DNA, 20 species of sardines (genera such as *Sardina, Sardinella, Clupea, Ophistonoma* and *Ilisha*) and a similar number of horse mackerel species (*Trachurus, Caranx, Mullus, Rastrelliger* and others), originating from seas all over the world, were identified (Fátima C. et al., *European Food Research and Technology*, 2011, 232(6):1077-1086; Fátima C. et al., *Journal of Agricultural and Food Chemistry*, 2011; 59 (6): 2223-2228).

In various embodiments, differences in biosynthetic pathways may be used to trace nutritional substances to their origin or to determine the purity and/or quality of nutritional substances. For example, differences in biochemical pathways are used to identify corn-fed chicken, which are more expensive. The analytical method exploits the differences between the biosynthetic pathways that exist between maize (C4 pathway) and temperate cereals such as wheat and barley (C3 pathway). C3 and C4 plants provide markedly different $^{13}C/^{12}C$ ratios when measured using stable isotope ratio mass spectrometry. Comparison with a database of results from chickens fed differing maize diets provides a means of confirming that a chicken was fed on corn (maize) (Perks, B., *Chemistry World* 2007 49-52).

In additional embodiments, arrays, including but not limited to sensor-arrays may be used to trace nutritional substances to their origins and/or to determine the origin of nutritional substances from a mixture thereof. For example, colorimetric sensor arrays may be used to distinguish between a variety of coffee beans using their aromas (Suslick et al., *Anal Chem* 2010 82(5):2067-2073).

Various other technologies may be used to correlate nutritional substances to their origins including but not limited to nanotechnology (Rashidi L and Khosravi-Darani K. 2011 Crit Rev Food Sci Nutr. 2011 51(8):723-30; Staggers et al., Nurs Outlook. 2008 September-October; 56(5):268-74; Chaudhry et al., 2008 Food Addit Contam Part A Chem Anal Control Expo Risk Assess 25(3):241-58; Srinivas et al., J. Nutr. 2010 January; 140(1):119-24), chromatography (Lobinski, R. and Szpunar J. *Hyphenated techniques in speciation analysis*, Royal Society of Chemistr, Cambridge 2003), mass spectrometry (Brinkman, U A T. *Hyphenation: hype and fascination*, Elsevier Science Ltd, Amsterdam 1999), electronic noses (Walt D R., *Anal chem* 2005 77:A-45; Gardner J W et al., *Electronic noses: principles an applications*. Oxford University press, New York, 1999; Aernecke M J, Walt D R. Sens Actuators 2009; 142:464-469; Anslyn E V. J Org Chem 2007; 72:687-699; Lewis N S. Acc Chem Res 2004; 37:663-672; Röck F, Barsan N, Weimar U. Chem Rev 2008; 108:705-725; Hierlemann A, Gutierrez-Osuna R. Chem Rev 2008; 108:563-613; Hsieh M-D, Zellers E T. Anal Chem 2004; 76:1885-1895; Grate J W. Chem Rev 2000;

100:2627-2647; Janata J, Josowicz M. Nat Mater 2003; 2:19-24; Wolfbeis O S. J Mater Chem 2005; 15:2657-2669; 1 James D, Scott S M, Ali Z, O'Hare W T. Microchimica Acta 2005; 149:1-17.), determining carbon isotope ratios (Primrose, S., *Trends in Food Science and Technology* 2010 21(12): 582-590), quantitative SNP genotyping (Primrose, S., *Trends in Food Science and Technology* 2010 21(12):582-590). Additionally, nutritional substances may be genetically modified with, for example, long terminal repeat (LTR) sequences which would serve as unique fingerprints for the nutritional substance. For example, bananas from Mexico may express a LTR sequence that is different compared to the bananas from India. Various genetic and DNA profiling processes may be used to correlate nutritional substances to their origin and would be apparent to a person of skill in the art. Such methods include but are not limited to restriction fragment length polymorphism (RFLP) analysis, polymerase chain reaction (PCR) analysis, short tandem repeats (STR) analysis, amplified fragment length polymorphism (AmpFLP) analysis, mitochondrial DNA analysis or combinations thereof.

A nutritional substance encoding a molecular tag may further comprise an associated label, mechanical tag or and electronic tag. The information about the nutritional substance and the encoded molecular tag about the origin is stored in a storage system. The nutritional content values may provide the starting values for calculating the change in nutritional content ($\Delta N$) as the nutritional substance is transported from the creator to the consumer 600, either directly or indirectly, via anyone or more of the preservation system 300, transformation system 400, conditioning system 500, or a combination thereof. As the nutritional substance moves through each of the aforementioned systems, the nutritional content information is updated in the Information Module 100, thus providing a $\Delta N$ value and a more accurate representation of the nutritional content in the nutritional substance.

Optionally, the tags may also include information about the nutritional content of the nutritional substance. In some embodiments, information about the creation/origin and the nutritional content of a nutritional substance is on the same tag. Additionally, a single electronic or mechanical tag may encode a unique information identifier that directs a user to a storage system that includes information about the origin, nutritional content and nutritional value of the nutritional substance. A single electronic tag or a single mechanical tag may encode information about the origin and the nutritional content of a nutritional substance. Alternately, a single electronic tag or a single mechanical tag may encode information about the origin and a unique information identifier associated with the nutritional substance. In some embodiments, a single electronic tag or a single mechanical tag may encode information about the origin, the unique information identifier and the nutritional content of a nutritional substance.

Optionally, different tags comprise information about the origin, nutritional content and a unique information identifier for each nutritional substance. For example, a molecular tag (such as a unique nucleic sequence identifier or a unique protein expression pattern) may provide information about the origin of a nutritional substance and a mechanical tag may provide information about the nutritional content and/or a unique information identifier for the nutritional substance.

Encoding module 220 takes the nutritional substance creation information from the accumulation module 210 and transforms that information into a form that can be marked on the nutritional substance. The encoded information from encoding module 220 is transmitted to the marking module 230. The encoding module 220 can convert the creation information to the form needed for the marking module, such as a compact, formatted human-readable form. Alternately, encoding module 220 can convert the creation information into a compact machine readable form for imprinting by the marking module 230.

Encoding module 230 can create a label and/or code to be attached, incorporated, or detected, to the nutritional substance that contains the information which specifically pertains to that nutritional substance. The marking module 230 can create a standalone label which is attached to the nutritional substance, which will later be removed before use of the nutritional substance. Such labels can be made of paper, plastic, foil, cardboard, glass or other synthetic material or be integrated with and/or within the nutritional substance through irrigation, fertilization, nourishing, genetics, etc.

Alternately, the marking module can create the label directly on or detect the nutritional substance in a fashion that does not degrade the nutritional substance. Examples include ink made for edible food dye, laser etching of nutritional substance surface, and branding by heat or chemicals or identification of the particular molecules or particular organoleptic characteristics contained or incrusted onto the nutritional substance itself.

Additionally, marking module 230 can generate a label to apply to the nutritional substance which is consumable along with the nutritional substance. Examples include rice paper, edible substances and materials from other nutritional substances.

The label created by marking module 230 may contain the information from accumulation module 210 encoded by encoding module 220 in consumer readable form. Such a label could list the various creation information so that a consumer could read it, for example variety of the banana, where it was grown, when it was planted and harvested, and any non-natural substances that were added to the banana during its cultivation. Such information may be compacted using industry standards that consumers have learned to read and through the combination or mix of ingredients and or sequence on which the ingredients are grown/raised, processed/treated and-or prepared for consumption.

In another example, a package of hamburger meat could include a label containing creation information, such as the lineage of the cow, where and when it was raised and slaughtered, what it was fed, and any nutritional supplements it was given.

Figure 4:
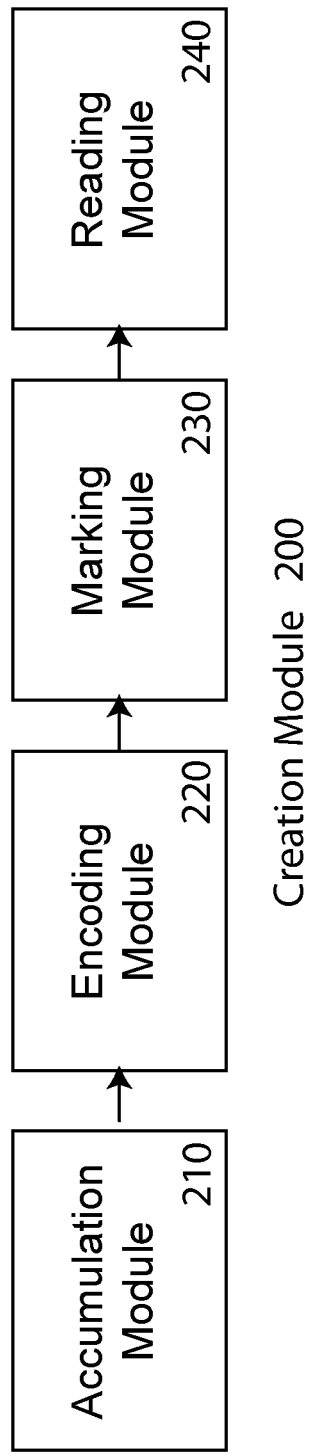
FIG. 4 shows a schematic functional block diagram of the creation module 200 according to an alternate embodiment of the present invention.

In FIG. 4, the information from accumulation module 210 is encoded by encoding module 220 in a compact, machine readable form which is used by the marking module 230 to create the label. Such a label could be in the form of a barcode or QR Code. In this case, the information is still stored directly on the nutritional substance, but will require reader module 240 to retrieve the information.

In the case of the package of hamburger meat, the user of the hamburger meat would use label reader 240 to retrieve the creation information from the label. If the user is a hamburger patty manufacturer, it will utilize the creation information obtained from label reader 240 to track the hamburger patty products it produces and ships to its customers. It could use such creation information in the preparation of the hamburger patty. For example, such creation information could affect how the hamburger meat is cooked. The user could also pass such creation information along to its customers along with its manufacturing information including in the way it was raised "grass fed" or slaughtered "kosher".

Figure 5:
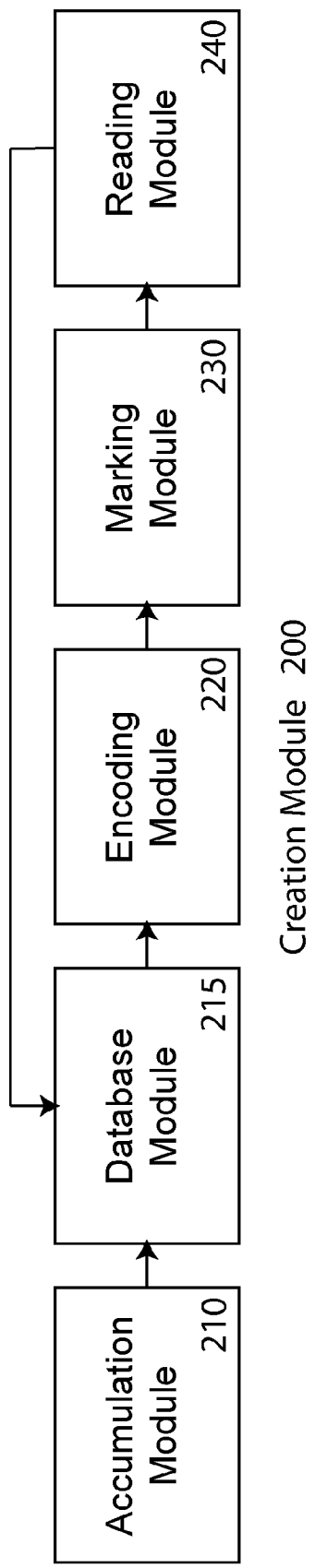
FIG. 5 shows a schematic functional block diagram of the creation module 200 according to an alternate embodiment of the present invention.

FIG. 5 is an embodiment of the present invention where the creation information is stored in a database for eventual reference by the user of the nutritional substance. Accumulation module 210 accumulates the creation information from the nutritional substance's creation, this information is stored in database module 215 and could be monitored in real time though a local or global access network.

Database module 215 stores the information in a persistent format for later use by the users of the nutritional substance. In its preferred embodiment, encoding module 220 generates a reference code for the creation information stored in database module 215, which it provides to marking module 230 creates a label for the nutritional substance which includes the reference code. The reference code on the label created by the marking module 230 can be in human readable form, such as an alphanumeric code. In such a case, the user of the nutritional substance could use the reference code to obtain the creation information from database 215. Access to database module 215 by a user of the nutritional substance, such as a consumer, might be accomplished by means of a telecommunication system, such as a wireless telecommunication system accessed by means of a personal computing device, such as a tablet computer running a nutritional substance app.

Alternatively, marking module 230 could create a label which includes a machine readable version of the reference code. This could take the form of a barcode or QR Code which could be used to retrieve the creation information from database module 215. In this embodiment, the label reader 240 would read the barcode or QR Code on the label to obtain the reference code which would then be used to retrieve the creation information from database 215.

Figure 6:
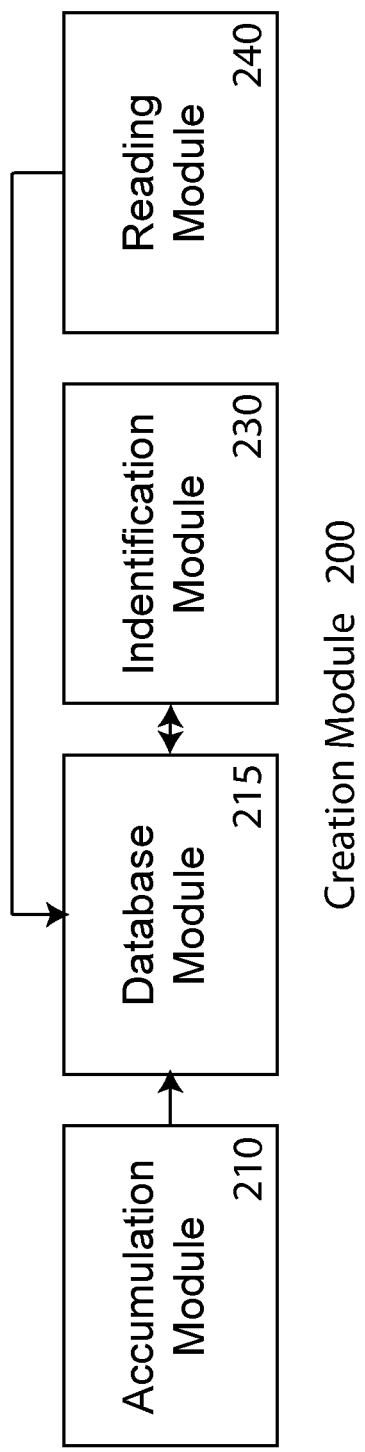
FIG. 6 shows a schematic functional block diagram of the creation module 200 according to an alternate embodiment of the present invention.

FIG. 6 shows an embodiment of the creation/origin module of the present invention. During the creation/origin of the nutritional substance, creation information regarding the origin and creation of the nutritional substance can be accumulated by accumulation module 210. This creation information is generally known by the creator of the nutritional substance. For example, the grower of sweet corn, knows the land and contacts the seed and traits producer to decide on the seeds that need to be planted in consequence knows the seeds that were planted, knows where the corn seed is planted, when the corn seed was planted, the soil conditions, the source of the water used to irrigate the corn, when the corn is to be harvested or the truffles gathered. Additionally, the grower knows what fertilizers, pesticides, and other substances were used to nourish and protect during growing of the corn.

Accumulation module 210 receives and stores all such creation information that is available from the grower. Accumulation module 210 can take the form of a computer running a data storage program, such as a database.

The creation information is stored in a database module 215 for eventual reference by the user of the nutritional substance. Accumulation module 210 accumulates the creation information from the nutritional substance's creation, which is stored in database module 215.

Database module 220 stores the information in a persistent format for later use by the users of the nutritional substance. In its preferred embodiment, encoding module 220 generates a reference code for the creation information stored in database module 215, which it provides to identification module 230. The identification module 230 identifies a unique identifier of the nutritional substance, which it provides back to the database module 215 for storage with the related creation information from accumulator module 210.

Identification module 230 creates unique identification information for a nutritional substance. In one embodiment, the identification module 230 analyzes the nutritional substance to obtain a unique identifier for the nutritional substance that can be used to reference creation information accumulated by accumulation module 210 and stored in database 215. For example, a particular variety of corn may have certain molecules in it that are unique to where and/or how it was grown. The identification module 230 would provide a link back to the creation information database module 215.

Reader module 240 would be used by the user of the nutritional substance to obtain the unique identifier necessary to retrieve the creation information from database 215. For example, the user of sweet corn received from a grower would use reader module 240 to obtain the unique identifier of corn it has received to retrieve the creation information from database module 215 for that corn. That information could be used in the processing of the corn, such as into canned sweet corn. Additionally, such creation information could be passed along to the consumer of the sweet corn with possibly the manufacturing information of the canned sweet COM.

In another embodiment of the present invention, a unique identifier could be added or formed within the nutritional substance. Such a unique identifier would not harm or degrade or affect the aesthetic value of the nutritional substance. It also would not be dangerous to the consumer of the product. In short, it should be transparent to the user of the nutritional substance. Such unique identifiers can take the form of specific molecules or chemicals not naturally found in the nutritional substance. It also could take the form of nanoparticles specifically designed to form a unique identifier.

Further, a unique identifier could be created in a product by adding a substance which interacts with some known feature of a specific nutritional substance to form a unique identifier. A chemical compound which interacts with a compound naturally occurring within a nutritional substance could create a unique identifier for that product. For example, if cattle are raised on different ranges which include food that has different amounts of a certain chemical which is incorporated into their tissue, a substance could be added during processing of the resulting meat which would interact differently with the substances obtained in the cow to produce differing unique identifiers. This would allow a particular unique identifier in a particular piece of beef to be traced back to its creation information.

Access to database module 215 by a user of the nutritional substance, such as a consumer, might be accomplished by means of a telecommunication system, such as a wireless telecommunication system accessed by means of a personal computing device, such as a tablet computer running a nutritional substance app.

Figure 7:
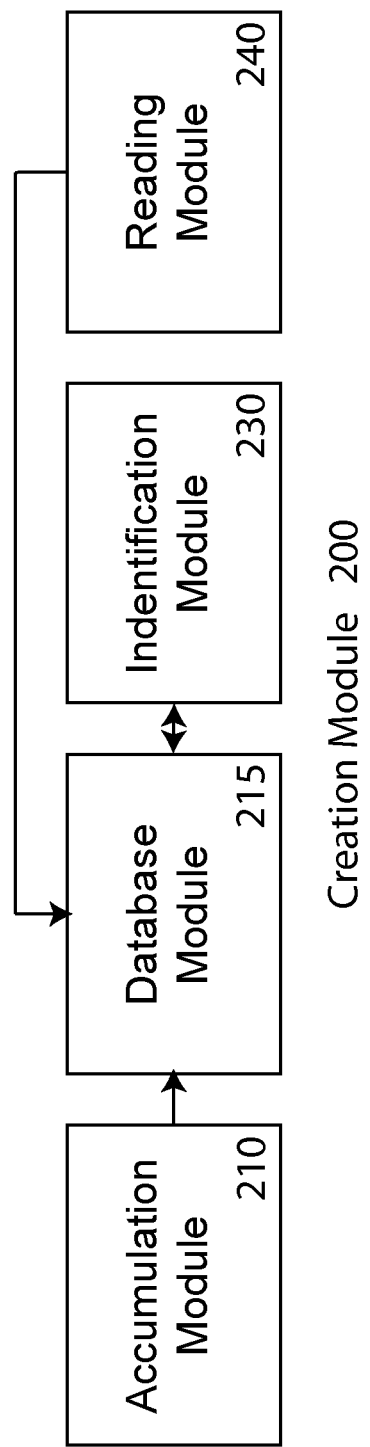
FIG. 7 shows a schematic functional block diagram of the creation module 200 according to an alternate embodiment of the present invention.

FIG. 7 shows an embodiment of the creation/origin module of the present invention. During the creation/origin of the nutritional substance, creation information regarding the origin and creation of the nutritional substance can be accumulated by accumulation module 210. This creation information is generally known by the creator of the nutritional substance. For example, the grower of sweet corn, knows the land and contacts the seed and traits producer to decide on the seeds that need to be planted in consequence knows the seeds that were planted, knows where the corn seed is planted, when the corn seed was planted, the soil conditions, the source of the water used to irrigate the corn, when the corn is to be harvested or the truffles gathered. Additionally, the grower knows what fertilizers, pesticides, and other substances were used to nourish and protect during growing of the corn.

Accumulation module 210 receives and stores all such creation information that is available from the grower. Accumulation module 210 can take the form of a computer running a data storage program, such as a database.

The creation information is stored in a database module 215 for eventual reference by the user of the nutritional substance. Accumulation module 210 accumulates the creation information from the nutritional substance's creation, which is stored in database module 215.

Database module 220 stores the information in a persistent format for later use by the users of the nutritional substance. In its preferred embodiment, encoding module 220 generates a reference code for the creation information stored in database module 215, which it provides to identification module 230. The identification module 230 identifies a unique identifier of the nutritional substance, which it provides back to the database module 215 for storage with the related creation information from accumulator module 210.

Identification module 230 creates unique identification information for a nutritional substance. In one embodiment, the identification module 230 analyzes the nutritional substance to obtain a unique genetic identifier for the nutritional substance that can be used to reference creation information accumulated by accumulation module 210 and stored in database 215. For example, a particular variety of corn may have certain genes in it that are unique to where and/or how it was grown. The identification module 230 would provide a link back to the creation information database module 215. For example, such a unique genetic identify could be expressed in the corn by a unique color of the husk or silk.

Reader module 240 would be used by the user of the nutritional substance to obtain the unique genetic identifier necessary to retrieve the creation information from database 215. For example, the user of sweet corn received from a grower would use reader module 240 to obtain the unique genetic identifier of corn it has received to retrieve the creation information from database module 215 for that corn. That information could be used in the processing of the corn, such as into canned sweet corn. Additionally, such creation information could be passed along to the consumer of the sweet corn with possibly the manufacturing information of the canned sweet corn.

In another embodiment of the present invention, a unique genetic identifier could be added or formed within the genetic code of the nutritional substance. Such a unique genetic identifier would not harm or degrade or affect the aesthetic value of the nutritional substance. It also would not be dangerous to the consumer of the product. In short, it should be transparent to the user of the nutritional substance. Such unique identifiers can take the form of specific gene sequence not naturally found in the nutritional substance. It also could take the form of gene sequence which expresses a specifically designed to form a unique identifier. Alternately, such an added or modified gene sequence could be completely dormant, but readable by reader module 240, by decoding part or all of the gene sequence of the nutritional substance.

Access to database module 215 by a user of the nutritional substance, such as a consumer, might be accomplished by means of a telecommunication system, such as a wireless telecommunication system accessed by means of a personal computing device, such as a tablet computer running a nutritional substance app.

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or sub-combinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. Any claims intended to be treated under 35 U.S.C. §112, ¶ 6 will begin with the words "means for." Accordingly, the applicant reserves the right to add additional claims after filing the application to pursue such additional claim forms for other aspects of the invention.

The invention claimed is:

1. A dynamic information identification system for nutritional substances, comprising:
   encoded information relating to the origin of a nutritional substance, the encoded information being encoded on or as part of the nutritional substance at least electronically, molecularly, chemically, genetically, or a combination thereof; and
   dynamic information relating to a change in the nutritional content of the nutritional substance, wherein the dynamic information relating to the change in the nutritional content comprises at least two values correlated to the encoded information and obtained under different conditions to determine $\Delta N$, where $\Delta N$ is at least one of a change in caloric, nutritional, organoleptic or aesthetic value of the nutritional substance; and
   a storage system for storing the origin information and the dynamic information, including $\Delta N$ values relating to the change in the nutritional content of the nutritional substance.

2. The dynamic information identification system of claim 1, further comprising a unique information identifier, wherein the unique information identifier is used to relate the origin information with the dynamic information relating to the change in the nutritional content of the nutritional substance stored in the storage system.

3. The dynamic information identification system of claim 1, wherein
   the information relating to the origin is encoded on or as part of the nutritional substance in any one or more of a mechanical tag, an electronic tag, a molecular tag, a chemical tag or a combination thereof; and
   the encoded information is indicative of the origin of the nutritional substance; and
   the encoded information is unique to a plurality of nutritional substances.

4. The dynamic information identification system of claim 3, further comprising a reader to read the encoded information, wherein the reader is any one or more of an optical reader, a mechanical reader, an electronic reader, a radio frequency reader, an electronic nose, or an assay to read molecular tags.

5. The dynamic information identification system of claim 3, wherein the mechanical tag is any one or more of a label, a barcode, a QR code or a combination thereof.

6. The dynamic information identification system of claim 3, wherein the electronic tag is a radio frequency identification tag.

7. The dynamic information identification system of claim 3, wherein the molecular tag is any one or more of a genetic markers, protein expression profile, microorganism biome, types and amounts of micronutrients, nanotechnology tags, ratios of carbon isotopes, gasses, aromas or a combination thereof.

8. The dynamic information identification system of claim 1, wherein
   the change in caloric, nutritional, organoleptic, or aesthetic value occurs during any one or more of creation of the nutritional substance, preservation of the nutritional substance, transformation of the nutritional substance, conditioning of the nutritional substance, consumption of the nutritional substance or a combination thereof.

9. The dynamic information identification system of claim 1, wherein the origin is any one or more of a specific farm, fishery, ranch, city, state, zip code, latitude and longitudinal positions or a combination thereof.

10. The dynamic information identification system of claim 1, wherein the storage system is a computer, a database, the cloud or a combination thereof.

11. A dynamic information identification system for nutritional substances comprising:
    origin information about a nutritional substance, wherein the origin information is encoded in or about the nutritional substance in any one or more of a mechanical tag, an electronic tag, a molecular tag, a chemical tag or a combination thereof, and
    the encoded information is unique to a plurality of nutritional substances, and
    the encoded information is indicative of the origin of the nutritional substance; and
    dynamic nutritional content information relating to a change in the nutritional content of the nutritional substance,
    wherein the dynamic nutritional content information provides an initial source value to determine a $\Delta N$, wherein
    $\Delta N$ is a change in caloric, nutritional, organoleptic or aesthetic value of the nutritional substance, and
    the change in caloric, nutritional, organoleptic or aesthetic value occurs during any one or more of creation of the nutritional substance, preservation of the nutritional substance, transformation of the nutritional substance, conditioning of the nutritional substance, consumption of the nutritional substance or a combination thereof; and
    a reader to read the encoded information; and
    an information storage system for storing the dynamic nutritional content information.

12. The dynamic information identification system of claim 11, further comprising a unique information identifier, wherein the unique information identifier is used to relate the encoded information with the dynamic nutritional content information stored in the storage system.

13. The dynamic information identification system of claim 11, wherein the reader is any one or more of an optical reader, a mechanical reader, an electronic reader, a radio frequency reader, an electronic nose, or an assay to read the molecular tags.

14. The dynamic information identification system of claim 11, wherein the origin information is related to any one or more of a specific farm, fishery, ranch, city, state, zip code, latitude and longitudinal positions or a combination thereof.

15. The dynamic information identification system of claim 11, wherein the mechanical tag is any one or more of a label, a barcode, a QR code or a combination thereof.

16. The dynamic information identification system of claim 11, wherein the electronic tag is a radio frequency identification tag.

17. The dynamic information identification system of claim 11, wherein the molecular tag is any one or more of a genetic markers, protein expression profile, microorganism biome, types and amounts of micronutrients, nanotechnology tags, ratios of carbon isotopes, gasses, aromas or a combination thereof.

18. The dynamic information identification system of claim 11, wherein the storage system is a computer, a database, the cloud or a combination thereof.

19. A method for generating a dynamic nutritional value table for a nutritional substance, comprising:
- obtaining origin information about the nutritional substance; wherein
  - the origin information is encoded in or about the nutritional substance in any one or more of a mechanical tag, an electronic tag, a molecular tag, a chemical tag or a combination thereof, and
  - the encoded information is unique to a plurality of nutritional substances, and
  - the encoded information is indicative of the origin of the nutritional substance; and
- obtaining dynamic information relating to changes in the nutritional content of the nutritional substance;
  - wherein the dynamic information relating to changes in the nutritional content provides an initial source value to determine a $\Delta N$, wherein $\Delta N$ is a change in caloric, nutritional, organoleptic or aesthetic value of the nutritional substance; and
- assigning a unique information identifier, wherein the unique information identifier is used to relate the encoded information with the information relating to changes in the nutritional content; and
- storing the information relating to changes in the nutritional content in a storage system, so as to generate a dynamic nutritional value table for the nutritional substance.

20. The method of claim 19, wherein the origin information is related to any one or more of a specific farm, fishery, ranch, city, state, zip code, latitude and longitudinal positions or a combination thereof.

21. The method of claim 19, wherein the mechanical tag is any one or more of the label, a barcode, a QR code or a combination thereof.

22. The method of claim 19, wherein the electronic tag is a radio frequency identification tag.

23. The method of claim 19, wherein the molecular tag is any one or more of a genetic markers, protein expression profile, microorganism biome, types and amounts of micronutrients, nanotechnology tags, ratios of carbon isotopes, gasses, aromas or a combination thereof.

24. The method of claim 19, wherein the storage system is a computer, a database, the cloud or a combination thereof.

25. The method of claim 19, wherein the change in caloric, nutritional, organoleptic or aesthetic value of the nutritional substance occurs during any one or more of creation of the nutritional substance, preservation of the nutritional substance, transformation of the nutritional substance, conditioning of the nutritional substance, consumption of the nutritional substance or a combination thereof.

* * * * *